US012638818B2

(12) United States Patent
Denning et al.

(10) Patent No.: US 12,638,818 B2
(45) Date of Patent: May 26, 2026

(54) HIGH AVAILABILITY REDUNDANT POWER MODULE WITH I/O INPUT MONITORING

(71) Applicant: Rockwell Automation Technologies, Inc., Mayfield Heights, OH (US)

(72) Inventors: Stephen E. Denning, Silver Lake, OH (US); Christopher R. Dorr, University Heights, OH (US); Arun Kumar Shivaraman, Singapore (SG); Daniel E. Killian, Eastlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 208 days.

(21) Appl. No.: 18/220,112

(22) Filed: Jul. 10, 2023

(65) Prior Publication Data

US 2024/0160175 A1 May 16, 2024

Related U.S. Application Data

(60) Provisional application No. 63/383,360, filed on Nov. 11, 2022.

(51) Int. Cl.
| | |
|---|---|
| *G05B 19/042* | (2006.01) |
| *G05B 13/02* | (2006.01) |
| *G05B 19/418* | (2006.01) |

(52) U.S. Cl.
CPC ....... G05B 19/0423 (2013.01); G05B 13/025 (2013.01); G05B 19/4186 (2013.01)

(58) Field of Classification Search
CPC ................................................ G05B 19/0423
USPC .......................................................... 710/8
See application file for complete search history.

(56) References Cited

U.S. PATENT DOCUMENTS

| | | | |
|---|---|---|---|
| 11,112,785 B2 * | 9/2021 | Cella | ..................... H04B 17/309 |
| 2010/0149997 A1 | 6/2010 | Law et al. | |
| 2012/0265361 A1 * | 10/2012 | Billingsley | ....... H02J 13/00004 |
| | | | 700/286 |
| 2015/0127876 A1 * | 5/2015 | Erni | ..................... G06F 13/4282 |
| | | | 710/315 |

(Continued)

OTHER PUBLICATIONS

EP Search Report for EP Application No. 23207395.7, Mailed Apr. 19, 2024, 6 pages.

*Primary Examiner* — Titus Wong
(74) *Attorney, Agent, or Firm* — Fletcher Yoder, P.C.

(57) ABSTRACT

A system, including a first power conditioner module (PCM) configured to provide a first power output, wherein the first PCM includes a first plurality of input/output (TO) points configured to electrically couple to a plurality of terminals. The system also includes a second power conditioner module (PCM) configured to provide a second power output, wherein the second PCM includes a second plurality of input/output points configured to electrically couple to the plurality of terminals. The second PCM also includes a control system configured to perform a verification operation on a first set of data received from the first PCM, wherein the first PCM received the first set of data from the first plurality of TO points, and send a second set of data to the first PCM, wherein the second set of data is received via the second plurality of TO points, and wherein the first PCM is configured to perform an additional verification operation on the second set of data.

20 Claims, 6 Drawing Sheets

(56) References Cited

U.S. PATENT DOCUMENTS

| | | | |
|---|---|---|---|
| 2016/0063841 A1* | 3/2016 | Schultz | G06F 13/4221 |
| | | | 340/601 |
| 2016/0285959 A1* | 9/2016 | Vasko | G05B 19/4185 |
| 2018/0059653 A1* | 3/2018 | Michalscheck | G05B 19/4184 |
| 2018/0101206 A1* | 4/2018 | Chapel | G06F 1/28 |
| 2019/0384371 A1 | 12/2019 | Morita et al. | |
| 2020/0073427 A1* | 3/2020 | Kobayashi | H02J 3/28 |
| 2020/0257256 A1* | 8/2020 | Zimmanck | H02J 3/14 |
| 2022/0246962 A1* | 8/2022 | Sudhan S | H01M 8/04992 |

* cited by examiner

HIGH AVAILABILITY REDUNDANT POWER MODULE WITH I/O INPUT MONITORING

CROSS-REFERENCE TO RELATED APPLICATION

This application claims priority to and the benefit of U.S. Patent Application No. 63/383,360, entitled "HIGH AVAILABILITY REDUNDANT POWER MODULE WITH I/O INPUT MONITORING", filed Nov. 11, 2022, which is herein incorporated by reference in its entirety for all purposes.

BACKGROUND

This disclosure relates generally to redundant fault tolerant systems. More specifically, embodiments of the present disclosure are related to incorporating redundant monitoring for input/output (IO) points (e.g., ports, pins) in redundant fault tolerant systems.

Industrial automation systems may include automation control and monitoring systems. The automation control and monitoring systems may monitor and/or receive status information and/or sensing data from a wide range of devices, such as valves, electric motors, various types of sensors, other suitable monitoring devices, or the like. Connecting these types of components to an industrial control system or any suitable industrial device may involve adding more components (e.g., IO modules) to provide an interface between the components and the respective device. However, these additional components may add complexity and costs to the industrial control system. As such, improved systems and methods for integrating these external components with an industrial control system or network of devices may be desirable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a first power conditioner module (PCM) configured to provide a first power output, wherein the first PCM includes a first plurality of input/output (IO) points configured to electrically couple to a plurality of terminals. The system also includes a second power conditioner module (PCM) configured to provide a second power output, wherein the second PCM includes a second plurality of input/output points configured to electrically couple to the plurality of terminals. The second PCM also includes a control system configured to perform a verification operation on a first set of data received from the first PCM, wherein the first PCM received the first set of data from the first plurality of IO points, and send a second set of data to the first PCM, wherein the second set of data is received via the second plurality of IO points, and wherein the first PCM is configured to perform an additional verification operation on the second set of data.

In another embodiment, a method includes receiving via a control system of a power conditioner module, input channel data, and sending, via the control system, the input channel data to an additional control system of a redundant power conditioner module, wherein the power conditioner module and the redundant power conditioner module are configured to provide power to one or more load devices. Further, the method includes receiving, via the control system, a discrepancy notification from the additional control system in response to the additional control system detecting a discrepancy in the input channel data based on the additional input channel data received by the additional control system. The method also includes sending, via the control system, an annunciation signal to a computing device in response to receiving the discrepancy notification.

In yet another embodiment, a non-transitory computer-readable medium comprising computer-executable instructions that, when executed by a processing system, is configured to cause the processing system to perform operations including receiving input channel data corresponding to a plurality of input/output (TO) data points and sending the input channel data to an additional processing system of a power conditioner module, wherein the power conditioner module is configured to provide power to one or more load devices. The instructions, when executed by the processing system, may also cause the processing system to perform operations including receiving a discrepancy notification from the additional processing system in response to the additional processing system detecting a discrepancy in the input channel data based on additional input channel data received by the additional processing system, wherein the additional input channel data corresponds to the plurality of IO data points, and sending an annunciation signal to a computing device in response to receiving the discrepancy notification.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
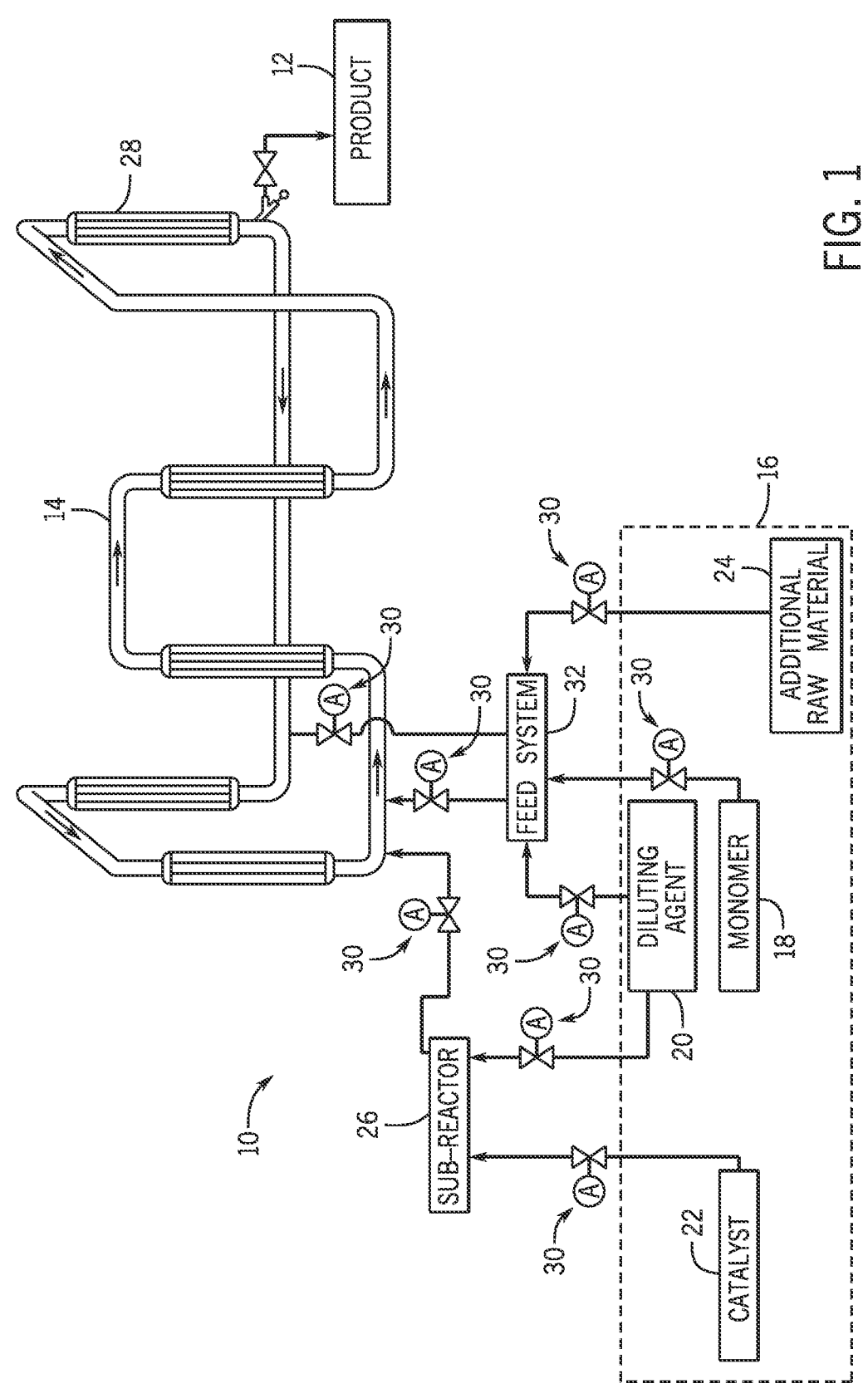
FIG. 1 is a diagrammatic representation of an example petrochemical-related process, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Certain devices, such as input/output (IO) modules, used in industrial systems may receive input data. The input data may then be routed to other devices for analysis, control operations, and the like. By way of example, certain components may be connected to dry contacts or other suitable low-level, low bandwidth cabinet dry contacts (e.g., thermostat, cabinet door alarm, power off detection). In some instances, these components may be connected to control systems via the IO modules. However, connecting these components to the control system via the IO modules may add complexity and costs. Therefore, it may be desirable to reduce the complexity and costs of connecting these components by providing improved systems and methods for integrating these components with the control system.

With the foregoing in mind, the present disclosure is generally directed toward integrating input/output (TO) points (e.g., ports, pins) into power conditioner modules (PCM) to perform operations and interface with other components. For example, redundant, fault-tolerant PCMs may respectively include the IO points that may interface with other components. A control system of each respective PCM may monitor a status (e.g., a state) of the other components. Further, each respective control system may communicate the status of each IO point of the IO points via adapters and a communication component (e.g., multipoint low voltage differential signaling (MLVDS) communication) to each other. In addition, each respective control system may communicate discrepancy information related to each IO point to each other. In an embodiment, the IO points integrated into each respective PCM may provide communication access to a removable terminal block (RTB). The RTB may correspond to general-purpose cabinet inputs that may provide status information for various types of equipment (e.g., relays, thermostats, door sensors, etc.).

In another embodiment, the status data of each IO point may be communicated between each control system of each respective PCM to verify that each pair of IO points from both PCMs are detecting the same status data of each IO point. That is, each respective PCM may send the other PCM data collected by each IO point to confirm that both sets of IO points receive the same data. If the control system of either respective PCM determines the same status data of each IO point is not being received, then the respective control system may send an annunciation signal and/or a discrepancy bit to a user via a computing device (e.g., an adapter). In this manner, redundant monitoring of the IO points may be provided while minimizing the complexity and costs involved with interfacing with other components via the RTB or other suitable components. Furthermore, even if one PCM becomes unavailable, the IO points may still be monitored by the other PCM.

By way of introduction, FIG. 1 is a diagrammatic representation of a petrochemical-related process in which embodiments described below may be implemented. That is, the PCM may provide redundant monitoring operations for various types of industries, such as petrochemical-related processes, to meet certain industry standards with regard to highly available systems. In this particular example, a reactor system 10, such as a polymerization reactor capable of processing olefin monomers, like ethylene or hexene, to produce homopolymers or co-polymers as products 12 is described. Any suitable reactor may be used, including batch, slurry, gas-phase, solution, high pressure, tubular or autoclave reactors, or any combination thereof. For ease of discussion, FIG. 1 refers to a loop reactor 14 for polymerization. However, it should be noted that the discussion set forth below is intended to be applicable, as appropriate, to any petrochemical process, industrial process, manufacturing process, or the like, as a way to provide context to the following discussion of FIGS. 2-6.

Production processes, like the polymerization reactor process shown in FIG. 1, may occur on an ongoing basis as part of a continuous operation to generate products (e.g., product 12). Sometimes a variety of both continuous and batch systems may be employed throughout a production process. Various suppliers may provide reactor feedstocks 16 to the reactor system 10 via pipelines, trucks, cylinders, drums, and so forth. The suppliers may include off-site and/or on-site facilities, including olefin plants, refineries, catalyst plants, on or off-site laboratories, and the like. Examples of possible feedstocks 16 include olefin monomers 18, diluents or diluting agents 20, catalysts 22, and/or other additives. The other feed components, additional raw materials 24, may also be provided to the reactor 14. Feedstocks 16 may change when using different manufacturing processes and/or when manufacturing a different final product. The feedstocks 16 may be stored or processed in any suitable vessel or process, such as in monomer storage and feed tanks, diluent vessels, catalyst tanks, co-catalyst cylinders and tanks, treatment beds like molecular sieve beds and/or aluminum packing, and so forth, prior to or after being received at the reactor system 10. The reactor system 10 may include one type of reactor in a system or multiple reactors of the same or different type, and desired processing conditions in one of the reactors may be different from the operating conditions of the other reactors.

The product 12 may be moved from the reactor system 10 for additional processing, such as to form polymer pellets from the product 12. In general, the product 12, or processed product (e.g., pellets) may be transported to a product load-out area for storage, blending with other products or processed products, and/or loading into railcars, trucks, bags, ships, and so forth, for distribution to customers.

Processes, like the reactor system 10, may receive or process feedstocks 16 at relatively high pressures and/or relatively high temperatures. For example, a hydrogen feedstock may be handled by the reactor system 10 via pipeline at approximately 900-1000 pounds per square inch gauge (psig) at psig at 90-110° F. Furthermore, some products may be generated using highly reactive, unstable, corrosive, or otherwise toxic materials as the feedstock 16 or as intermediate products, such as hydrogen sulfide, pure oxygen, or the like. Heat, pressure, and other operating parameters may be employed appropriately to obtain appropriate reaction conditions, which may increase a reactivity, instability, or corrosive nature of the feedstock 16. These materials may be desired to be processed and transported using reliable and highly available systems, for example, to reduce a likelihood of a release event from occurring.

Each of the feedstocks 16, sub-reactor 26, and/or feed system 32 may use different operating parameters to create suitable output intermediate products for use in subsequent reactions or as a product output. Operating parameters of the reactor system 10 may include temperature, pressure, flow rate, mechanical agitation, product takeoff, component concentrations, polymer production rate, and so forth, and one or more may be selected on to achieve the desired polymer properties. Controlling temperature may include using a gas burner, an electrical heating conduit, a heat exchange device 28, or the like, to increase or reduce the temperature of intermediate products of the reactor system 10. As an example, during operation, a cooling fluid may be circulated within the cooling jackets of the heat exchange devices 68 as needed to remove the generated heat and to maintain the temperature within the desired range, such as between approximately 150° F. to 250° F. (65° C. to 121° C.) for polyethylene.

Figure 2:
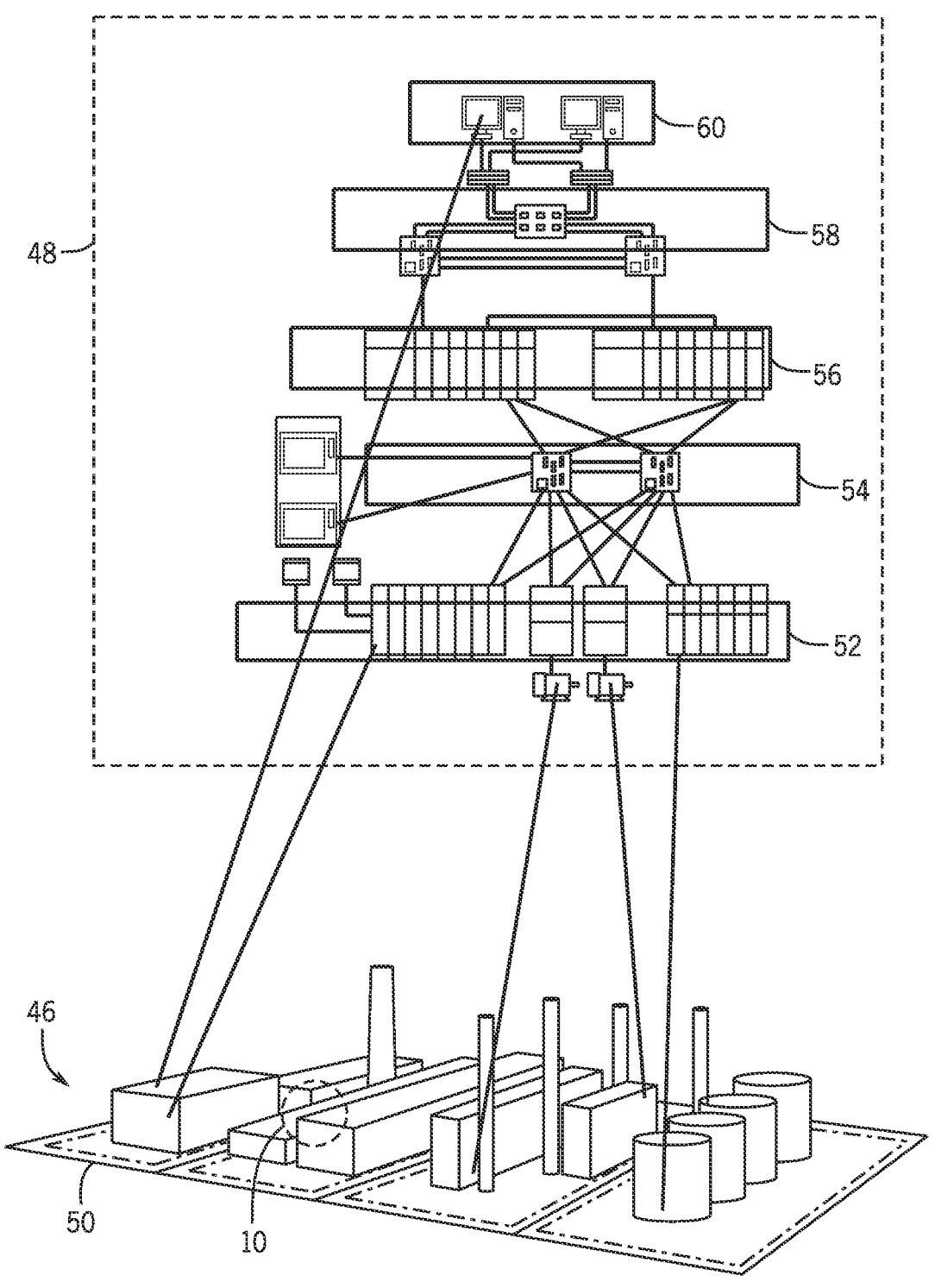
FIG. 2 is an illustration of an industrial automation system that includes a distributed control system (DCS), in accordance with an embodiment.

Feedstock 16 flow rates, control of operating parameters, and the like, may be managed by a control system (e.g., like the control system shown in FIG. 2). The control system may generate control signals, for example, control signals that are transmitted to one or more actuators 30 to cause the actuator to open or close (or partially open or partially close) as a way to control operating parameters of the feedstock 16, control of other operating parameters, and the like. Care may be taken when adjusting operating parameters since petrochemical manufacturing processing may be highly sensitive to erroneous operation. For example, fractions of a percentage of reliability change in a control system of the reactor system 10 may make a difference between a process being taken offline or a process working as expected.

With the foregoing in mind, the components of the reactor system 10 may be connected to power supplies, power supply conditioners, and other systems that enable the components to be highly available. Moreover, it should be noted that the present embodiments described herein may be implemented in a variety of industrial environments and should not be limited to the reactor system 10 described above.

Referring now to FIG. 2, FIG. 2 is an illustration of an example industrial automation system 46 that includes a distributed control system 48 (e.g., a "DCS"). The industrial automation system 46 may include the reactor system 10 from FIG. 1 and/or any number of industrial automation components.

Industrial automation components may include a user interface, the distributed control system 48, a motor drive, a motor, a conveyor, specialized original equipment manufacturer machines, fire suppressant system, and any other device that may enable production or manufacture products or process certain materials. In addition to the aforementioned types of industrial automation components, the industrial automation components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial automation components may also be related to various industrial equipment such as mixers, machine conveyors, tanks, skids, specialized original equipment manufacturer machines, and the like. The industrial automation components may also be associated with devices used in conjunction with the equipment such as scanners, gauges, valves, and the like. In one embodiment, every aspect of the industrial automation component may be controlled or operated by a single controller (e.g., control system). In another embodiment, the control and operation of each aspect of the industrial automation components may be distributed via multiple controllers (e.g., control system).

The industrial automation system 46 may divide logically and physically into different units 50 corresponding to cells, areas, factories, subsystems, or the like of the industrial automation system 46. The industrial automation components (e.g., load components, processing components) may be used within a unit 50 to perform various operations for the unit 50. The industrial automation components may be logically and/or physically divided into the units 50 as well to control performance of the various operations for the unit 50.

The distributed control system 48 may include computing devices with communication abilities, processing abilities, and the like. For example, the distributed control system 48 may include processing modules, a control system, a programmable logic controller (PLC), a programmable automation controller (PAC), or any other controller that may monitor, control, and operate an industrial automation device or component. The distributed control system 48 may be incorporated into any physical device (e.g., the industrial automation components) or may be implemented as a standalone computing device (e.g., general purpose computer), such as a desktop computer, a laptop computer, a tablet computer, a mobile device computing device, or the like. For example, the distributed control system 48 may include many processing devices logically arranged in a hierarchy to implement control operations by disseminating control signals, monitoring operations of the industrial automation system 46, logging data as part of historical tracking operations, and so on.

In an example distributed control system 48, different hierarchical levels of devices may correspond to different operations. A first level 52 may include input/output communication modules (IO modules) to interface with industrial automation components in the unit 50. A second level 54 may include control systems that control components of the first level and/or enable intercommunication between components of the first level 52, even if not communicatively coupled in the first level 52. A third level 56 may include network components, such as network switches, that support availability of a mode of electronic communication between industrial automation components. A fourth level 58 may include server components, such as application servers, data servers, human-machine interface servers, or the like. The server components may store data as part of these servers that enable industrial automation operations to be monitored and adjusted over time. A fifth level 60 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 48 may use and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 48. In this way, the distributed control system 48 may be application-specific, or general purpose.

Furthermore, portions of the distributed control system 48 may be a or a part of a closed loop control system (e.g., uses feedback for control), an open loop control system (e.g., does not use feedback for control), or may include a combination of both open and closed system components and/or algorithms. Further, in some embodiments, the distributed control system 48 may utilize feed forward inputs. For example, depending on information relating to the feedstocks 16 (e.g., compositional information relating to the catalyst 22 and/or the additional raw material 24, the distributed control system 48 may control the flow of any one or a combination of the feedstocks 16 into the sub-reactor 26, the reactor 14, or the like.

Each of the levels 52, 54, 56, 58, 60 may include component redundancies, which may help provide a high availability control system. For example, within the first level, redundant and concurrently operating backplanes may provide power to each of the IO modules.

Figure 3:
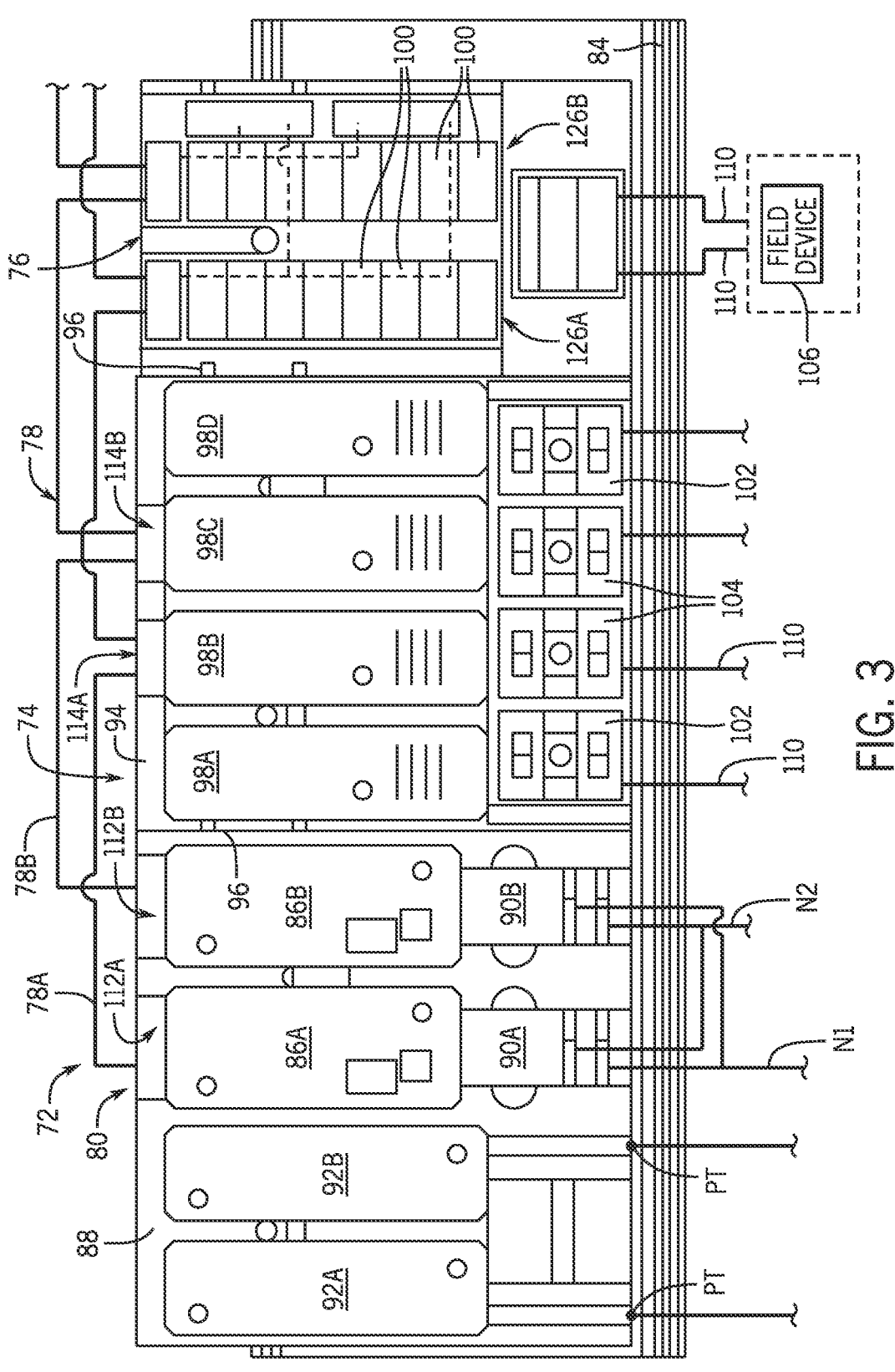
FIG. 3 is an illustration of a distributed modular input/output (IO) system, in accordance with an embodiment.

To elaborate, FIG. 3 is an illustration of a distributed modular IO system 72 associated with the distributed control system 48 of FIG. 2. The distributed modular IO system 72 may include IO devices 74, an IO module 76 and backplanes 78 (78A, 78B). The distributed modular IO system 72 may include a network adapter 80 having two or more adapter modules 86 (86A, 86B).

The network adapter 80 may be coupled to at least one industrial automation network N1, N2. The first and second redundant industrial automation networks N1, N2 may be Parallel Redundancy Protocol (PRP) LAN networks, Ethernet/IP networks, or other industrial automation networks so that the network adapter 80 may receive data from, transmits data to, and otherwise communicates with one or more industrial control modules, control systems, processing circuitry, or the like, such as one or more programmable logic controllers (PLC), microprocessors, and/or other electronic processors for machine and/or process control.

The network adapter 80 may include a base 82 mounted to the support rail 84 or other support structure. The network adapter 80 may include first and second identical or otherwise redundant adapter modules 86 (86A, 86B) operating in parallel with each other. The redundant adapter modules 86 may each be releasably connected to the adapter base 88. Each of the adapter modules 86 may be operably connected to both the first and second networks N1, N2 by connections in the adapter base 88. The adapter modules 86 may also include electronic circuitry to communicate data with circuitry coupled to the networks N1, N2, with IO devices 74, or with other interconnected components.

The network adapter 80 may include first and second media landing modules 90 (90A, 90B) removably coupled to the first and second adapter modules 86 through the adapter base 88. The media landing boards 90 may each include at least two network connectors NC, such as RJ45 connectors, Small FormFactor Pluggable (SFP) connectors, optical fiber connectors, or the like. The industrial networks N1, N2 may be coupled to the media landing boards 90 via the network connectors NC, and thus be connected to the adapter modules 86 though the media landing boards 90.

The IO device 74 redundant power conditioning and supplying IO modules (power conditioners) 92 (92A, 92B), which may be coupled to the adapter base 88 and may include a power input terminal PT. The power input terminal PT may be used when connecting with at least one source of electrical power, such that the power conditioners 92 may supply system electrical power to the network adapter 80 via the adapter base 88, as well as to other components coupled to the backplane 78. As shown herein the power input terminals PT are removably connected to the adapter base 88 and are operably connected to the power conditioners 92 through the adapter base 88.

The IO device 74 may include a base 94 also mounted to the support rail 84 or another support structure. The base 94 may be located adjacent to base 82. The base 94 may be operably, physically, and/or electrically connected to the base 82 via multi-contact electrical connectors 96 such that the backplane 78 may power and communicate between the network adapter 80, IO devices 74, the industrial networks N, and the like. FIG. 3 shows the backplane 78 as being external to the IO device 74, but those of ordinary skill in the art will recognize that the backplane 78 circuit or network is physically and electrically constructed within and extends through printed circuit boards and other circuitry located in the bases 88 and bases 94 via the electrical connectors 96.

In some embodiments, the IO device 74 may include IO processing modules (IO modules) 98 (98A, 98B, 98C, 98D). The IO modules 98 may be removably connected to the base 94 in respective mounting slots via electrical connections, such that each of the IO modules 98 may be operatively coupled to the backplane 78. The IO modules 98 may use the backplane 78 to communicate with the network adapter 80, the other 10 (sub)modules 98, 100, and the like. In one embodiment, at least two of the IO modules 98 are identical to each other and operated in parallel with each other to provide a redundancy with respect to each other.

The base 94 may include at least one terminal block 102, which may include cage clamps, spring clamps, screw terminals, or other wiring connectors 104 that are adapted to be connected to field cables or field wiring I/O that are each associated with a field device 106. The field device 106 may be an analog or digital device such as a sensor, flow meter, switch, probe, thermocouple, RTD, encoder, or the like, and the field device 106 may receive input data or transmit output data via the terminal blocks 102.

The network adapter 80 may include independent "adapter" Ethernet switches 112 (112A, 112B), which may be operably connected to, form part of, and establish the backplane 78. Similarly, the IO devices 74 may include independent IO module Ethernet switches 114 (114A, 114B) that may be operably connected to, form part of, and establish the backplane 78. The switches 112 and the switches 114 may be identical but are numbered differently to facilitate description of their operation. The switches 112, 114 may perform a packet switching operation to direct data communication of any suitable backplane network/protocol.

In some embodiments, the distributed modular IO system 72 may include the IO module 76. The IO module 76 may be a single-channel IO device that includes one or more removable and replaceable single-channel IO submodules 100. The IO module 76 may include a base adapted for mounting on a support rail 84 or another support structure. The base may include multi-contact electrical connectors 96 to form a portion of the backplanes 78. The IO module 76 may include a terminal block. The IO module 76 may include at least two configurable IO modules 126 (126A, 126B). However, in some embodiments, the IO module 76 may not be used in the distributed modular IO system 72. As will be described in further detail below, the IO module 76 may be replaced by the IO points, which may be integrated into power conditioner modules 92.

Short and long term monitoring operations of the industrial automation system 46 may be used to perform predictive maintenance operations, as well as reactive or other maintenance activities. Further, short and long term monitoring operations of the industrial automation system 46 may be managed by components of the distributed control system 48, for example, by commands to perform specific operations (and resulting data) being propagated throughout the various levels of the distributed control system 48.

Figure 4:
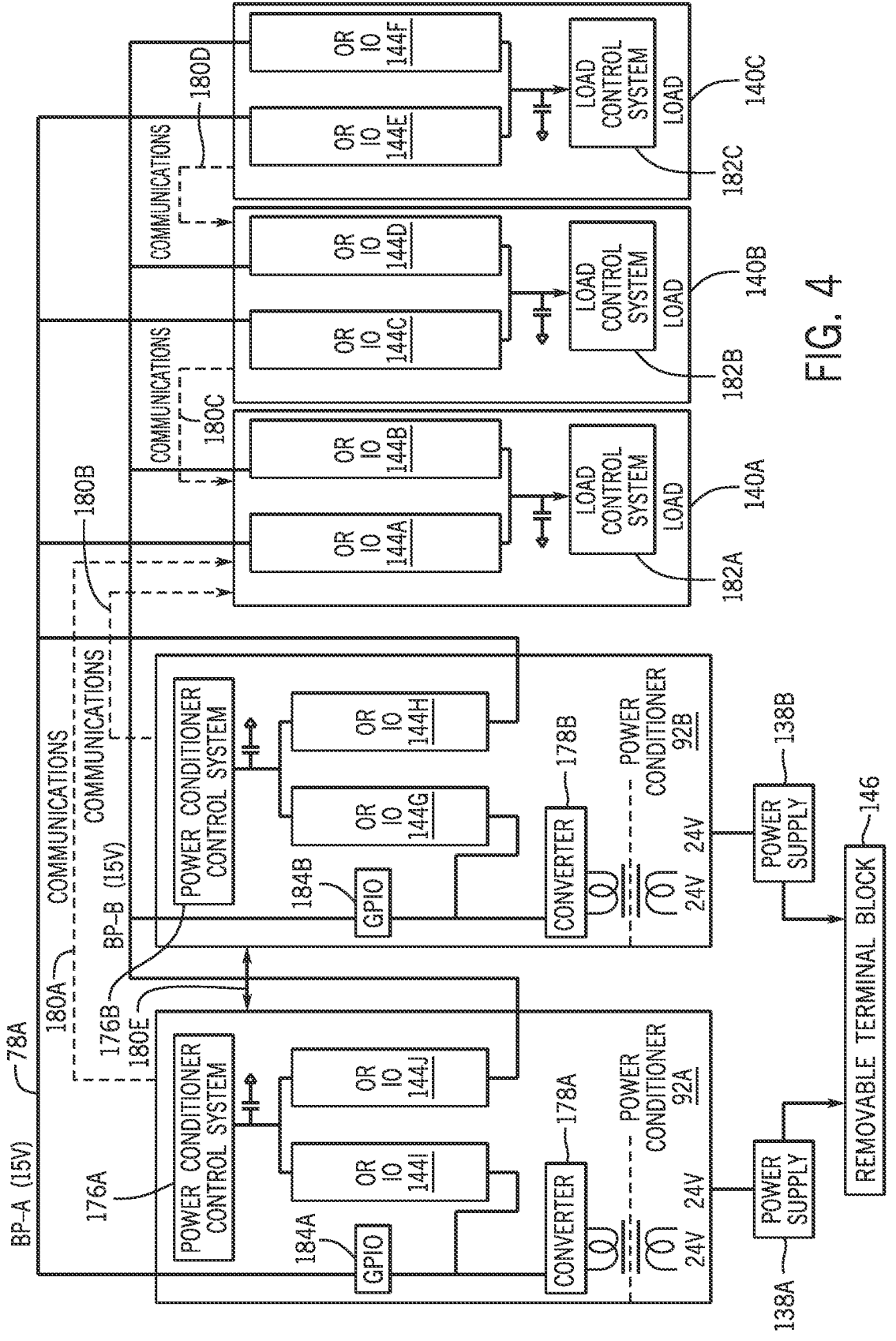
FIG. 4 is a block diagram of a portion of the distributed modular IO system of FIG. 3, in accordance with an embodiment.

FIG. 4 is a block diagram of the power conditioners 92, loads 140, OR IO circuitry 144 (144A, 144B, 144C, 144D, 144E, 144F, 144G, 144H, 144I, 144J) and a terminal block 146 (e.g., removable terminal block or "RTB"). The power conditioners 92 may include power conditioner control systems 176 (176A, 176B). The loads may include devices such as adapters, bus interface modules (BIMs), IOs, and the like. Further, the loads 140 may include load control systems 182 (182A, 182B, 182C). The power conditioners 92 may be coupled to the backplanes 78 via the OR TO circuitry 144G-J, such as to power the load power conditioner control systems 176 and the load control systems 182. Each of the loads 140 may couple to each backplane 78 via the OR TO circuitry 144A-F. Although described herein as a two-backplane redundant system, it should be understood that any number of backplanes greater than two may be used to provide additional redundancy to the distributed control system 48. In any case, the power conditioners 92 may provide a redundant power source for the connected components (e.g., the loads 140) to ensure that the connected components have a high availability.

In some embodiments, the power conditioners 92 may include a dual power feed for powering each power conditioner control systems 176A, 176B of the power conditioners 92. Some loads 140 may not include load control systems 182. The backplanes 78A may be fed internally in the power conditioner 92A, and the backplane 78B may come from the partner power conditioner 92B.

Each power conditioner 92 may include one of power converters 178 (178A, 178B) to independently convert input power into output power. Power conditioner control systems 176A, 176B may control respective outputs from the power conditioner 92. For example, the power conditioner control system 176A may instruct a change in output from the power converter 178A, which changes the output from the power conditioner 92A to the backplane 78A. The power converters 178 may be any suitable type of power converter, such an AC-to-DC converter, a DC-to-DC converter, an AC-to-AC converter, a DC-to-AC converter, a diode rectifier, one or more static switches, or the like. The power converter 178 as shown is a DC-to-DC converter that steps down 24V input to 15V output on the backplanes 78. The input power may be received from power supplies 138 coupled upstream from the power conditioner 92. The power supplies 138 may couple to the power conditioner 92 via respective converters to further step down or convert power supplied to the power conditioner 92. These converters may be additional to the power converters 178 included in the power conditioner 92. The power converters 178 may be thought of local power output control that may be tailored to operation of loads 140 coupled to the backplane while a converter coupled external to the power conditioner 92 and downstream of a power supply 138 may prepare supply signals for use by the power conditioner 92. Each power conditioner 92 may be independently coupled to respective power supplies 138 to reduce a likelihood of common cause fault taking downstream system components offline. In some cases, the OR TO circuitry 144 is also included between the power supplies 138 and the power conditioner 92 to provide each power conditioner 92 with concurrent and redundant sources for power. By using the OR TO circuitry 144, the power conditioners 92 may provide redundant and concurrent amounts of power to the loads 140 via the backplane 78.

The OR TO circuitry 144 may include circuitry to power—or supply inputs or outputs to or from the associated device. Indeed, merely paralleling power supplies without additional protection may lead to interrupted operation when a fault occurs, a removal of another device, or the like. Thus, the OR TO circuitry 144 may include devices that enable inrush current and/or fault current protection. Some OR TO circuitry 144 may include semiconductor diodes, and some OR TO circuitry 144 include transistor-based current protections. Generally, the OR TO circuitry 144 internal circuitry prevents backflow of current from a direction of intended delivery (e.g., current transmitted toward the loads 140 from the power conditioner 92).

Communication paths 180 may also couple the power conditioner 92 to the loads 140. The loads 140 are shown as interconnected using a daisy chain communication pathway, in which each subsequent load of the loads 140 connects back to the TO module 98 (control) via an adjacent load of the loads 140. It is noted that any suitable communication architecture may be used to interconnect the loads 140 with upstream control circuitry of the distributed control system 48.

Moreover, in some cases, the backplane 78 may include such a structure able to include both power supply paths and the communication paths 180. For instance, a communication path 180A may couple the power conditioner 92A to the load 140A, which may be an adapter module. A communication path 180B may couple the power conditioner 92B to the load 140A. The load 140A may couple to downstream loads 140 via daisy chained communication paths 180. For example, the load 140A is coupled to the load 140B via the communication path 180C, and the load 140B is coupled to the load 140C via the communication path 180D. The loads 140 may periodically send data to the load 140A, acting as the adapter, to enable the load control system 182A to monitor operating conditions and/or statuses of each of the loads 140. The load 140A may use the data from one or more of the loads 140 to diagnose a particular operation as isolated to one load 140 or instead be affecting multiple loads 140.

This data and diagnostic capability may enable the upstream control circuitry, like the adapter modules 86, to diagnose a particular operation as isolated to one backplane 78 or instead be affecting multiple backplanes 78. Input currents for the backplanes 78 may also be used during a load share diagnostic operation to determine whether an input current shifts to the proper rail when the power conditioner 92 force a voltage imbalance between backplane 78A and backplane 78B.

In addition, the power conditioners 92 may each include general-purpose input points 184 (184A, 184B) (IO points). In some embodiments, the power conditioners 92 (92A, 92B) may each include a number (e.g., sixteen) of IO points 184. The IO points 184 may monitor power supply status dry contacts or any other low level, low bandwidth cabinet dry contacts (e.g., thermostat, enclosure door monitor, power off detection for mining, and so on). Moreover, the IO points 184 may be redundant and monitored separately by each power conditioner control system 176 of each power conditioner 92. It should be noted that although the power conditioners are described below as including sixteen IO points, any number of IO points may be integrated into the power conditioners 92 for monitoring.

As shown in FIG. 4, a terminal block 146 may be coupled to both of the power conditioners 92 (92A, 92B). In some embodiments, the terminal block 146 may be part of a separate structure that is assembled and coupled to the power conditioners 92. The terminal block 146 may be connected to the IO points to provide status information (e.g., a state, input channel data) and/or discrepancy information for various types of equipment (e.g., relays, the thermostat, door sensors, and so on) to a user.

Figure 5:
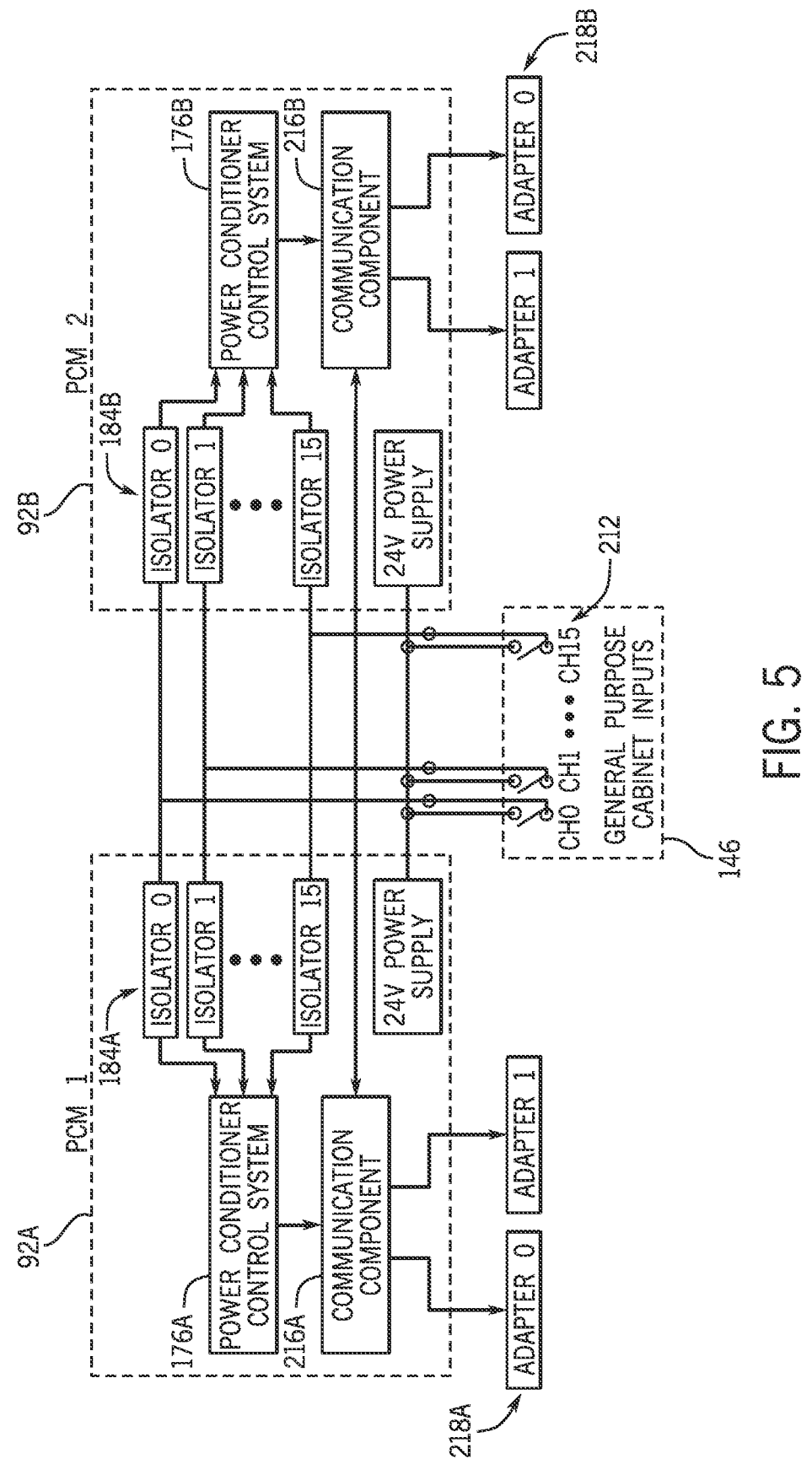
FIG. 5 is an illustration of a first power conditioner module and a second power conditioner module, which each include IO points, in accordance with an embodiment.

To elaborate, FIG. 5 is an illustration of a first power conditioner 92A and a second power conditioner 92B, such that each power conditioner 92 includes the IO points 184 (184A, 184B) in accordance with an embodiment. As illustrated in FIG. 5, the first power conditioner 92A may include sixteen IO points 184A (e.g., isolators 0-15), and the second power conditioner 92B may also include sixteen IO points 184B (e.g., isolators 0-15). In addition, the first power conditioner 92A and the second power conditioner 92B may each respectively include the power supply (138A, 138B) that may be coupled to dry contacts of the terminal block 146. In some embodiments, if the first power conditioner 92A or the second power conditioner 92B stop providing power, the power supply 138 of the active power conditioner may bus across the power to the other power conditioner. In this manner, if one power conditioner loses power, the other power conditioner may still be able to provide power.

In some embodiments, the terminal block 146 may reside on an adapter base (e.g., a rail master base). The IO points 184A of the first power conditioner 92A, and the IO points 184B of the second power conditioner 92B may be electrically coupled (e.g., wired) to a number of channels 212 (e.g., terminals) of the terminal block 146. Further, each number of channels 212 (e.g., CH0-CH15) of the terminal block 146 may connect to a device (e.g., a switch, relay) that may open or close depending on the status of each of the IO points 184 of the first power conditioner 92A and the second power conditioner 92B.

The first power conditioner control system 176A may detect the status of each of the IO points 184A. In turn, the second power conditioner control system 176B may detect the status of each of the IO points 184B. That is, the output from each of the IO points 184 may be sent to the respective power conditioner control system 176. Further, each respective power conditioner control system 176 may then send the status of each of the IO points 184 to a respective communication component (e.g., 216A or 216B). In some embodiments, the communication component 216 may employ a multi-point low voltage differential signaling (MLDVS) communication scheme, which corresponds to a multipoint high speed differential electrical interface that supports up to 32 nodes. However, any suitable communication scheme may be employed.

As illustrated in FIG. 5, the first power conditioner 92A and the second power conditioner 92B may each include one or more adapters 218 (218A, 218B). Each of the one or more adapters 218 (218A, 218B) may communicate with each respective power conditioner control system 176 (176A, 176B). In some embodiments, the respective one or more adapters 218 and the respective power conditioner control system 176 may communicate via a network (e.g., an Ethernet/IP network or other industrial automation network). In this manner, the one or more adapters 218 receive data from, transmit data to, and otherwise communicate with each respective power conditioner control system 176. As such, the communication component 216 may communicate the status of each of the IO points 184 to one or more adapters (218A, 218B). The one or more adapters 218 may then transmit a signal and/or a notification indicative of the status of each 10 point 184 to each other. It should be noted that although two adapters are illustrated in FIG. 5, any suitable number of adapters may be implemented.

In some embodiments, the communication component 216 (216A or 216B) of either one of the power conditioners 92 (92A or 92B) may communicate the status of each of the IO points 184 (184A or 184B) to the other power conditioner 92. That is, the first power conditioner 92A and the second power conditioner 92B may exchange information regarding the status of each of the IO points 184 via the adapters 218 and the power conditioner control systems 176.

As an example, the first power conditioner control system 176A may monitor the 16 IO points 184A. That is, the power conditioner control system 176A may detect the status of each of the IO points 184A and send the status to the second power conditioner control system 176B via the communication components 216 or the like. The second power conditioner control system 176B may compare the status of each of the IO points 184A to the status of each of the IO points 184B and determine if there is a discrepancy in the status of each of the IO points 184 (184A, 184B). The second power conditioner control system 176B may then transmit the discrepancy information to a separate computing or control device via the one or more adapters 218B. In this manner, the first power conditioner module 92A and the second power conditioner module 92B may perform redundant monitoring of the IO points 184. Additional details regarding the redundant monitoring services of the IO points 184 will be discussed in further detail below with regard to FIG. 6.

Figure 6:
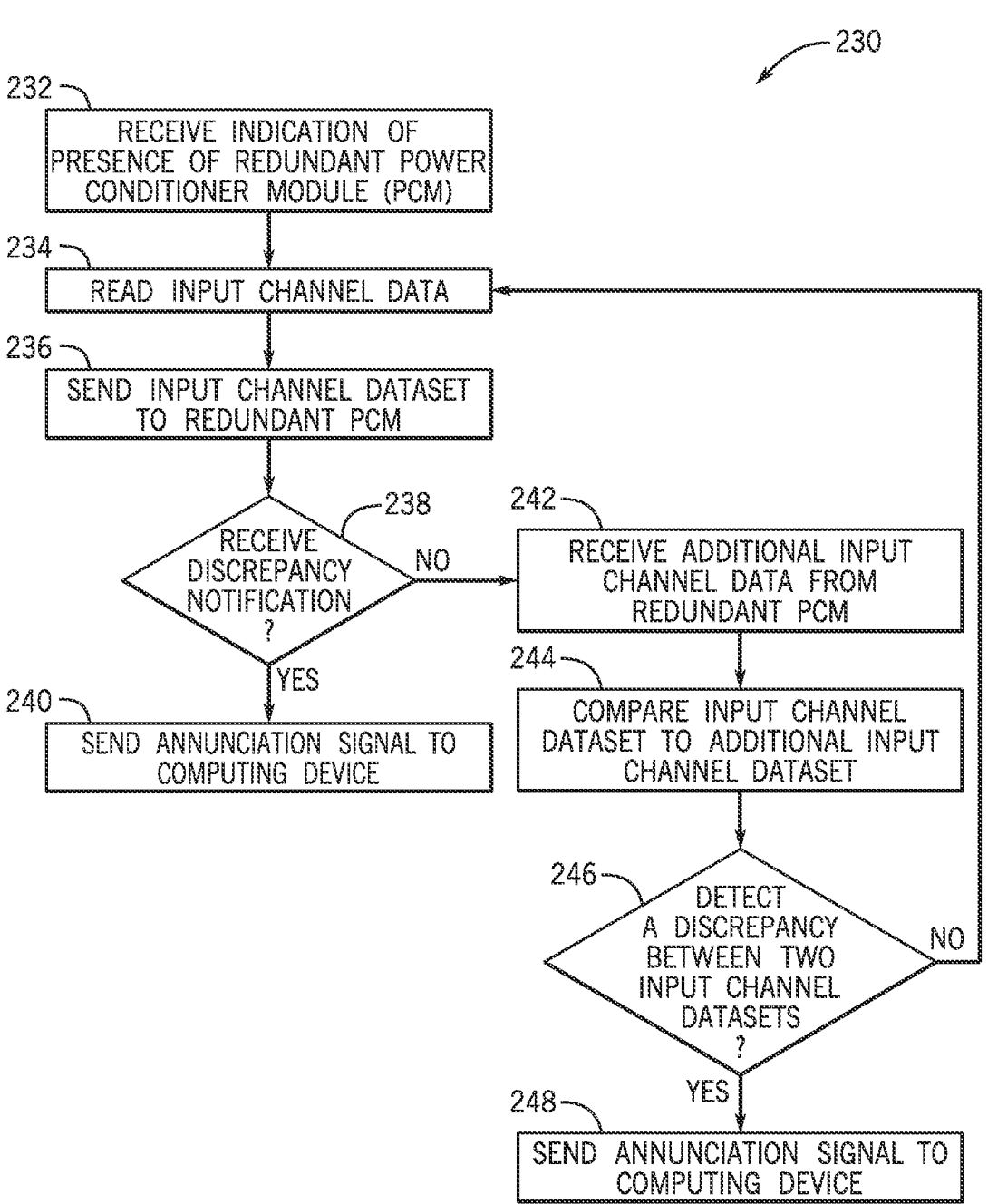
FIG. 6 is a flow diagram of a process in which the first power conditioner module and the second power conditioner module of FIG. 5 perform redundant monitoring services for the IO points, in accordance with an embodiment.

FIG. 6 is a flow diagram of a process 230 in which the first power conditioner control system 176A and the second power conditioner control system 176B of FIG. 5 perform redundant monitoring services for the IO points 184 (184A, 184B). Although the following description of FIG. 6 is discussed as being performed by the power conditioner control system 176 (176A, 176B), it should be understood that any suitable computing device may perform process 230 in any suitable order.

Referring now to FIG. 6, at process block 232, the power conditioner control system 176 (e.g., 176A) may receive an indication of a presence of a redundant power conditioner module (e.g., the second power conditioner module 92B).

That is, one power conditioner module 92 may broadcast (e.g., send a signal of) its presence (e.g., existence) via the communication component 216 for receipt by the other power conditioner module 92. For example, the first power conditioner module 92A may receive an indication of the presence of the second power conditioner module 92B, or vice versa.

At process block 234, the power conditioner control system 176 (e.g., 176A) may read input channel data from each of the IO points 184 (e.g., 184A). The input channel data may include a channel, quality information, and a state (e.g., high or low) output by each of the IO points 184. Further, at process block 236, the power conditioner control system 176 may send the input channel data to the redundant power conditioner control system. As an example, the first power conditioner module 92A may send the input channel dataset detected by the power conditioner control system 176A to the second power conditioner control system 176B of the second power conditioner module 92B via the communication component 216A.

In addition, the redundant power module (e.g., the second power conditioner 92B) may compare the received input channel dataset (e.g., of the first power conditioner 92A) to an additional input channel dataset related to each of the IO points (e.g., 184B) of the redundant power module. That is, the second power conditioner control system 176B may check and compare each channel of the IO points 184 of both power conditioner modules 92 to determine if there is a discrepancy (e.g., an error, or a mismatch in the comparison). For instance, the power conditioner control system 176A may detect that the state of channel two and channel ten of IO points 184A are high. In this case, the redundant power conditioner control system 176B may, in turn, determine if the received input channel dataset for channel two and channel ten of IO points 184B detected at same time frame (e.g., within time threshold) are also high. In this manner, the redundant power modules 92 may ensure the received input channel dataset is consistent.

If one of the power conditioner control systems 176 determines there is a discrepancy in one or more channels of the IO points 184, then the respective power conditioner control system 176 may send a discrepancy notification to the other the power conditioner control system 176. Thus, at process block 238, the power conditioner control system 176 may determine whether the discrepancy notification is received from the redundant power conditioner control system 176. In some embodiments, the discrepancy notification may include a bit that may indicate that the discrepancy is present.

If the discrepancy notification is received at process block 238, the power conditioner control system 176 may proceed to process block 240 and send an annunciation signal to the computing device of the user. The annunciation signal may include any suitable command that causes the computing device (e.g., mobile computing device) to produce an audio (e.g., an alarm) or visible indication (e.g., a notification displayed on a display of the computing device) that may notify the user of the discrepancy. In some embodiments, the command may cause the computing device to automatically execute an application or produce the alert while in a sleep mode, low power mode, while the application is not being executed, or the like. The annunciation signal may be sent to the one or more adapters 218 via the communication component 216 of the respective power conditioner module. In an embodiment, the annunciation signal may include a control signal that may adjust one or more operations of a component. For example, the control signal may cause the component to shut down (e.g., via a relay, a switch, or a circuit breaker). In this manner, the error may be isolated if an error is detected at one of the IO points 184. In another embodiment, the annunciation signal may include a wireless signal sent to an application running on the user's computing device. The user may then be notified of the discrepancy via the application.

With the foregoing in mind, and referring back to process block 238, if the power conditioner control system 176 does not receive a discrepancy notification, then the power conditioner control system 176 moves to process block 242. At process block 242, the power conditioner control system 176 (e.g., of the first power conditioner module 92A) may receive the additional input channel data of the redundant power conditioner module (e.g., the second power conditioner module 92B). Moreover, at process block 244, the power conditioner control system 176 may compare the input channel dataset to the additional input channel dataset. That is, the power conditioner control system 176 may check and compare each channel of each of the IO points 184 of the input channel dataset and the additional input channel dataset.

At process block 248, the power conditioner control system 176 may determine if there is a discrepancy between the two input channel datasets. Indeed, if the power conditioner control system 176 finds a mismatch in the input channel dataset and the additional input channel dataset, then that may indicate there is a discrepancy in the channel where the mismatch was discovered. In this case, the power conditioner control system 176 may proceed to process block 250 and send the annunciation signal to the computing device of the user. Thus, the user is notified of the discrepancy via the annunciation signal. However, if at process block 248, the discrepancy is not detected, the power conditioner control system 176 may return to process block 234 and perform the process 230 again as described above to continuously verify the detected input of the IO points 184.

Through the use of the present disclosure, the integration of the IO points 184 into each of the power conditioner modules 92 enables each power conditioner module 92 to respectively monitor each channel of each of the IO points 184. As such, each power conditioner module 92 may perform the redundant monitoring services. In this manner, if one power conditioner module 92 fails to provide power or is removed, the remaining power conditioner module 92 may still monitor the IO points 184 of the remaining power conditioner module 92.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:

a first power conditioner module (PCM) configured to provide a first power output, wherein the first PCM comprises:

a first plurality of input/output (IO) points configured to electrically couple to a plurality of terminals; and a first communication component configured to receive a first set of data from the first plurality of IO points; and a second power conditioner module (PCM) configured to provide a second power output, wherein the second PCM comprises:

a second plurality of input/output (IO) points configured to electrically couple to the plurality of terminals;

a second communication component configured to receive the first set of data from the first communication component using multipoint low voltage differential signaling (MLVDS); and a control system configured to:

compare the first set of data received from the first communication component to a second set of data received from the second plurality of IO points of the second PCM;

send the second set of data to the first communication component of the first PCM via the second communication component, wherein the first PCM is configured to compare the first set of data to the second set of data; and send an annunciation signal to a computing device, to the first communication component of the first PCM, or both in response to detecting a discrepancy between the first set of data and the second set of data, wherein the annunciation signal is configured to:

cause the computing device to present a notification indicative of an error at an IO point of the first plurality of IO points or the second plurality of IO points; and adjust an electric switch to isolate a component corresponding to the IO point of the first plurality of IO points or the second plurality of IO points, wherein the component corresponds to the error.

2. The system of claim 1, wherein an additional control system of the first PCM is configured to compare the first set of data to the second set of data to detect whether the discrepancy exists between the first set of data and the second set of data.

3. The system of claim 2, wherein the discrepancy corresponds to a mismatch in the first set of data and the second set of data.

4. The system of claim 2, wherein the control system is configured to receive an additional notification of the discrepancy from the additional control system.

5. The system of claim 1, wherein the each of the first plurality of IO points and the second plurality of IO points comprise general purpose input/output (GPIO) points.

6. The system of claim 1, wherein each of the first plurality of IO points and the second plurality of IO points comprises sixteen IO points.

7. A method, comprising:

receiving, via a control system of a power conditioner module, input channel data, wherein the control system receives the input channel data via a communication component that receives the input channel data from a first plurality of input/output (IO) points of the power conditioner module;

sending, via the control system, the input channel data to an additional control system of a redundant power conditioner module, wherein the power conditioner module sends the input channel data to the additional control system via the communication component using multipoint low voltage differential signaling (MLVDS), and wherein the power conditioner module and the redundant power conditioner module are configured to provide power to one or more load devices;

receiving, via the control system, a discrepancy notification from the additional control system in response to the additional control system detecting a discrepancy in the input channel data based on additional input channel data received by the additional control system; and sending, via the control system, an annunciation signal to a computing device, to the additional control system, or both in response to receiving the discrepancy notification, wherein the annunciation signal is configured to:

cause the computing device to present a notification indicative of an error at an IO point of the first plurality of IO points; and adjust an electric switch to isolate a component corresponding to the IO point of the first plurality of IO points, wherein, wherein the component corresponds to the error.

8. The method of claim 7, comprising:

receiving, via the control system, the additional input channel data;

comparing, via the control system, the input channel data to the additional input channel data;

detecting, via the control system, an additional discrepancy between the input channel data and the additional input channel data; and sending, via the control system, the annunciation signal to the computing device based on detecting the additional discrepancy.

9. The method of claim 8, wherein the additional channel input data by the additional control system is received within a threshold amount of time as the input channel data is received by the control system.

10. The method of claim 7, wherein the notification comprises an audio or a visual notification.

11. The method of claim 7, wherein the annunciation signal comprises a wireless signal sent to an application executing on the computing device.

12. The method of claim 7, wherein the discrepancy notification comprises a bit indicating the discrepancy.

13. A non-transitory computer-readable medium comprising computer-executable instructions that, when executed by a processing system, is configured to cause the processing system to perform operations comprising:

receiving input channel data via a communication component corresponding to a plurality of input/output (IO) data points;

sending the input channel data via the communication component using low voltage differential signaling (MLVDS) to an additional processing system of a power conditioner module, wherein the power conditioner module is configured to provide power to one or more load devices;

receiving a discrepancy notification from the additional processing system in response to the additional processing system detecting a discrepancy in the input channel data based on additional input channel data

17 received by the additional processing system, wherein the additional input channel data corresponds to the plurality of IO data points; and sending an annunciation signal to a computing device, to the additional processing system, or both in response to receiving the discrepancy notification, wherein the annunciation signal is configured to:

cause the computing device to present a notification indicative of an error at an IO data point of the plurality of IO data points; and adjust an electric switch to isolate a component corresponding to the IO data point of the plurality of IO data points, wherein the component corresponds to the error.

14. The computer-readable medium of claim 13, wherein the instructions, when executed by the processing system, is configured to cause the processing system to perform operations comprising:

receiving the additional input channel data;

comparing the input channel data to the additional input channel data;

detecting an additional discrepancy between the input channel data and the additional input channel data; and sending the annunciation signal to the computing device based on detecting the additional discrepancy.

15. The computer-readable medium of claim 14, wherein the instructions, when executed by the processing system, is configured to cause the processing system to perform operations comprising receiving the additional input channel data by the additional processing system within a threshold amount of time as the input channel data is received by the processing system.

16. The computer-readable medium of claim 14, wherein the discrepancy corresponds to a mismatch in the input channel data and the additional input channel data.

17. The computer-readable medium of claim 14, wherein the annunciation signal is configured to cause the computing device to present an audio or visual notification.

18. The computer-readable medium of claim 14, wherein the plurality of IO data points comprise sixteen IO data points.

19. The system of claim 1, wherein the first set of data comprises a first set of states respectively corresponding to each of the first plurality of IO points, and the second set of data comprises a second set of states respectively corresponding to each of the second plurality of IO points.

20. The system of claim 19, wherein an additional control system of the first PCM is configured to determine whether the discrepancy exists between the first set of states and the second set of states based on whether there is a mismatch between a state of the first set of states and a state of the second set of states.

* * * * *